United States Patent [19]

Komatsu et al.

[11] 4,058,134
[45] Nov. 15, 1977

[54] INTERCEPTOR ACTUATED BY SEISMIC VIBRATIONS

[75] Inventors: Atsushi Komatsu; Kuichiro Miyazawa, both of Saku; Yoshotomo Yamaura, Yachiho; Akira Asanuma, Saku, all of Japan

[73] Assignee: Kabushiki Kaisha Shinko Seisakusho, Usudamachi, Japan

[21] Appl. No.: 639,820

[22] Filed: Dec. 11, 1975

[30] Foreign Application Priority Data

Dec. 16, 1974 Japan .................. 49-144317
Dec. 16, 1974 Japan .................. 49-144318
Dec. 16, 1974 Japan .................. 49-144319

[51] Int. Cl.² .......................................... F16K 17/36
[52] U.S. Cl. .................. 137/38; 116/114 D; 137/556; 200/61.45 R
[58] Field of Search .............. 137/38; 116/114 D; 200/61.45 R

[56] References Cited

U.S. PATENT DOCUMENTS

| 3,878,858 | 4/1975 | Yamada | 137/38 |
| 3,965,917 | 6/1976 | Speck | 137/38 |

*Primary Examiner*—Robert G. Nilson

[57] ABSTRACT

An interceptor apparatus actuated by seismic and other vibrations comprising a substantially vertically movable rod, a weight capable of engagement with the rod and a plurality of pivotable support arms supporting the weight within a housing and held in a mechanically balanced state in entirety. When the apparatus undergoes seismic or other vibrations, the mechanical balance is lost, whereupon the weight is released from the support arms and is allowed to fall together with the vertically movable rod due to the gravitational forces, thereby effecting the switching of a related fluid circuit or electric circuit.

13 Claims, 11 Drawing Figures

4,058,134

INTERCEPTOR ACTUATED BY SEISMIC VIBRATIONS

FIELD OF THE INVENTION

This invention relates to interceptor apparatus actuated by vibratory energy such as seismic energy to switch related fluid or electric circuits and, more particularly, to one normally held in a mechanically balanced state and actuated when the mechanical balance is lost or upset by vibratory energy in excess of a predetermined magnitude.

BACKGROUND OF THE INVENTION

Earthquake and like vibratory phenomena are capable of breaking fluid pipe lines for petroleum and gases or grounding electrical transmission lines, thus giving rise to such secondary hazards as explosions, fires and the like.

Accordingly, a switching means for automatically closing or opening a related circuit, in response to vibrations above a predetermined magnitude, in which the circuit can be manually restored to the initial state for restoring the related circuit, has been desired. Also, such means should be desirably compact in construction and have a long service life.

Heretofore, various types of such means have been developed. However, those utilizing electricity or magnetism encounter difficulties in use in view of power stoppage which may be caused at the time of an earthquake, leading to operational failure at the time of the emergency and they also encounter difficulties in daily inspection and maintenance. Therefore, their use is limited to special cases. There have also been developed various mechanical switching means to the same end, and they include one, which utilizes a ball placed on a horizontal surface and adapted to roll and/or fall at the time of an earthquake, thereby closing a related circuit, and another, which utilizes a bar vertically placed on a horizontal surface and capable of falling at the time of an earthquake to close a related circuit.

Although these mechanical switching means have been generally well known, they have inherent drawbacks. Firstly, they are not sensitive to vertical vibrations though they can respond well to horizontal vibrations. Secondly, they are capable of being actuated when they are tilted by other effects. Thirdly, they do not respond to vibratory acceleration. This means that they cannot ensure reliable actuation by vibrations of energy above a predetermined magnitude and their response time fluctuates. Fourthly, their output is not large, and efforts to increase their output leads to increased size and weight of the whole construction due to the increased weight of the ball or bar and also to a complicated construction.

OBJECTS OF THE INVENTION

An object of the invention, accordingly, is to provide a switching apparatus actuated by vibrations, which is equally sensitive to both horizontal and vertical vibrations.

Another object of the invention is to provide a switching apparatus, which is not easily actuated even when it is tilted by other effects.

A further object of the invention is to provide a switching apparatus, which responds to vibratory acceleration and is reliably actuated by vibrations of vibratory energy above a predetermined magnitude, and also whose response time is constant.

A still further object of the invention is to provide a switching apparatus, which is small in size and light in weight, can produce a large output and is simle in mechanical construction and inexpensively obtainable.

The above and other objects, features and uses of the invention will become more apparent from the description of some preferred embodiments of the invention when the same is read with reference to the accompanying drawing.

DETAILED DESCRIPTION OF THE INVENTION

Figure 1:
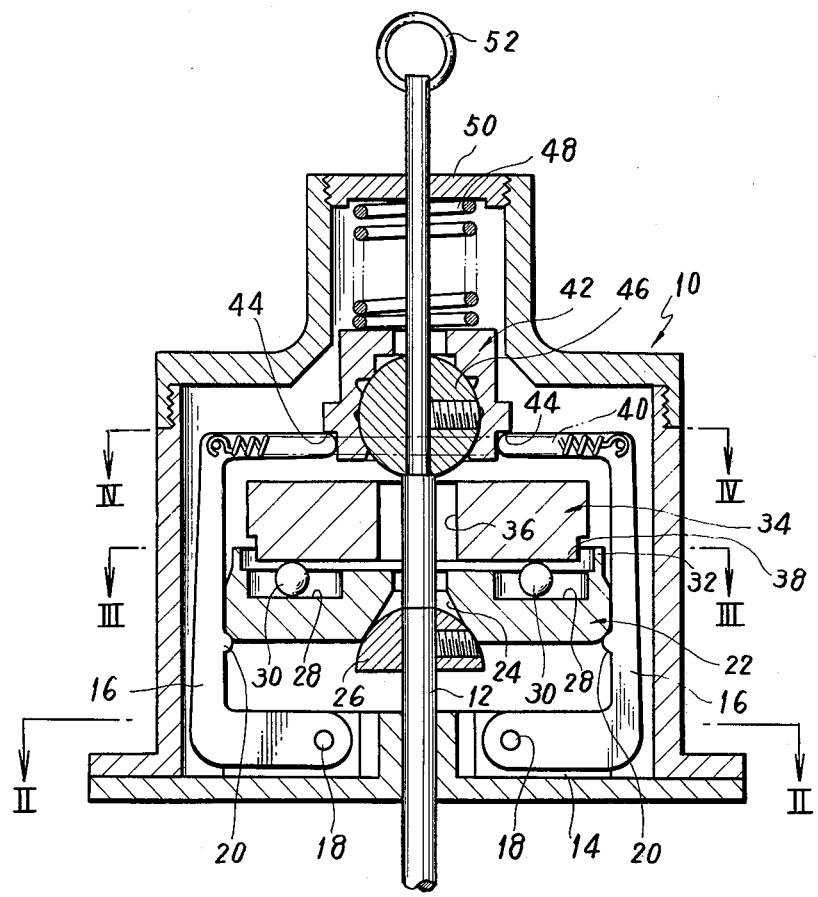
FIG. 1 is an axial sectional view of a first embodiment of the apparatus according to the invention.
Figure 2:
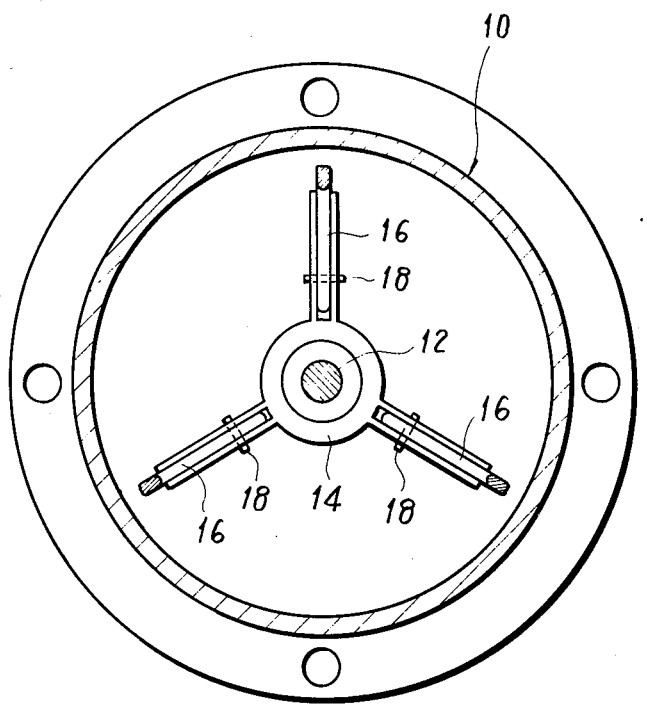
FIG. 2 is a section taken along line II—II in FIG. 1.
Figure 3:
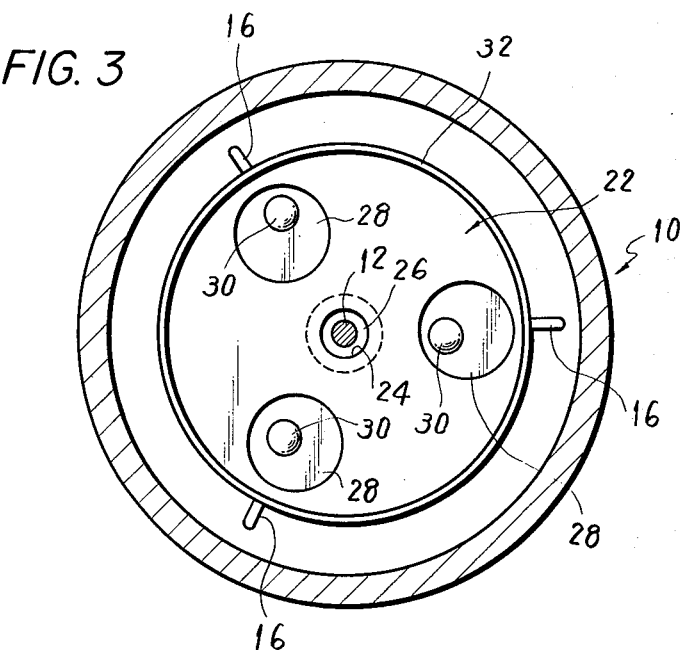
FIG. 3 is a section taken along line III—III in FIG. 1.

Referring now to FIG. 1, therein is shown a first embodiment of the apparatus actuated by vibrations. A vertically or substantially vertically movable rod 12 penetrates a coaxial cylindrical housing 10. The lower end of the rod 12 is provided with a microswitch (not shown) or a valve (not shown). A stay mount 14 concentric with the rod 12, as most clearly shown in FIG. 2, is secured to the bottom of the housing 10. Three stays 16 radially spaced apart at a uniform angular spacing of 120° with respect to the axis of the stay mount 14 are pivoted thereto by respective pins 18. These stays 16 are provided at their intermediate position with respective inner protuberances 20. A weight 22 is supported at three points on its outer periphery by upper portions of the individual protuberances 20. The weight 22 has a central throughbore 24 penetrated by the rod 12. The bore 24 has a downwardly flaring lower portion. A hemi-spherical weight support member 26 is secured to a lower portion of rod 12. The weight 22 which is penetrated by the rod 12 is in engagement with the weight support member 26. Thus, the weight 22 is rotatable about the weight support member 26. The weight 22 is formed on its upper side with three circular recesses 28 radially spaced apart at a uniform angular spacing of 120°, as is most cleary shown in FIG. 3. A ball 30 is retained within each circular recess 28 and can roll within the recess 28. The weight 22 has an upper peripheral annular extension 32. A second weight 34 which is freely placed on the balls 30 has a lower stepped portion 38 corresponding to the extension 32.

Figure 4:
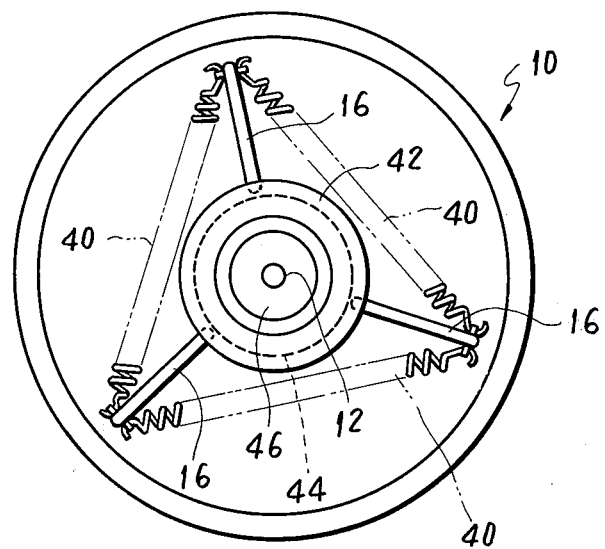
FIG. 4 is a section taken along line IV—IV in FIG. 1.
Figure 5:
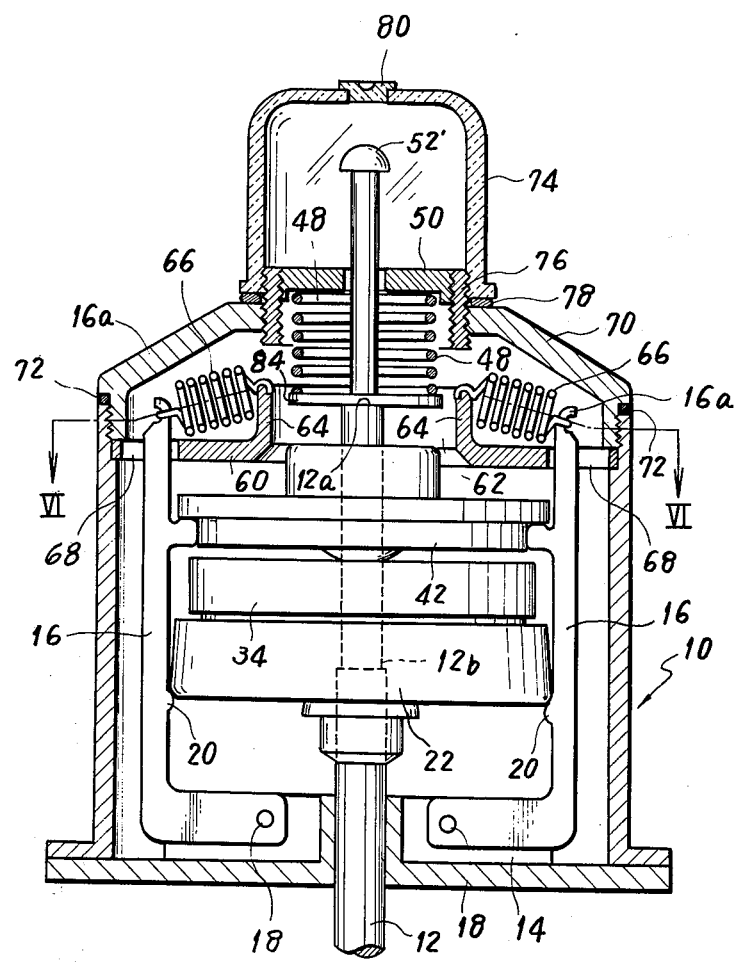
FIG. 5 is an axial sectional view of a second embodiment of the apparatus according to the invention.
Figure 6:
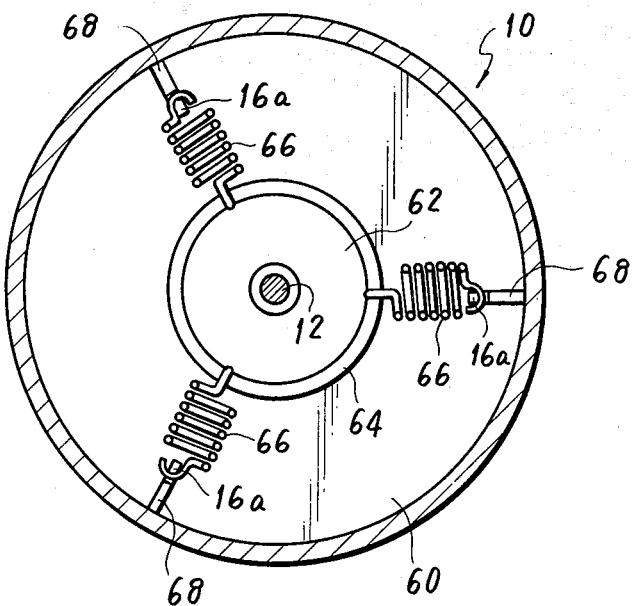
FIG. 6 is a section taken along line VII—VII in FIG. 5.

Three tension springs 40 are provided in the arrangement of an equilateral triangle, with each tension spring 40 stretched between head portions of adjacent stays 16, such that they bias the stays 16 radially inwardly, as is most clearly shown in FIG. 4.

Designated at 42 is a keeper member secured to an upper portion of the rod 12 and having a lower stepped portion 44. Keeper member 42 serves to engage the upper ends of stays 16 and regulate the inward rotation of the stays 16 urged by the tension springs 40, thereby steadily holding the weight 22 in position. The keeper member 42 is supported by rod 12 via a ball 46. A spring 48 is provided between the keeper member 42 and the top of the housing 10, and the rod 12 is urged downwardly by the spring pressure of the head spring 48.

An adjustment screw 50 is screwed into the top of the housing 10 for guiding and adjusting the spring pressure of the head spring 48. The spring pressure of the head spring 48 is greater than the spring pressures of the individual tension springs, and these spring pressures are mechanically balanced.

An upper end of the rod 12 extending from the top of the housing 10 is provided with a manual restoration ring 52.

The operation of the above construction will now be described.

Normally it is in its set state of FIG. 1. When the apparatus experiences vibrations such as seismic vibrations above a predetermined magnitude, the head spring 48 and tension springs 40 undergo motions according to the gravitational accelerations exerted. The head spring 48 undergoes spring motion particularly with axial vibrations, while the tension springs 40 undergo spring motion particularly with vibrations in horizontal directions. With these spring motions, the weight 22 the keeper member 42 are vibrated vertically. The weight 22 rotates around support member 26 and as a result, the second weight 34 slides in the direction of inclination of the weight 22 thereby to strike the extension 32. The rotation of weight 22 and the impact of weight 34 causes at least one of the stays to pivot about pin 18 so that stepped portion 44 on keeper 42 is released if the applied force exceeds the force of friction between each stay 16 and the keeper member 42 and the spring pressure of each tension spring 40. When stay 16 is released from engagement with keeper member 42 against the afore-mentioned forces, the keeper 42 tilts downwardly at the location where it is no longer supported by stay 16. The keeper 42 is now unstably supported by the remaining two stays and the rod 12 is forced downwardly by the weight of the weight 22, second weight 34 and keeper member 42 and the spring force of the head spring 48, thereby effecting a switching of the construction in a valve or microswitch. From this state, the state of FIG. 1 is restored by raising the ring 52 by hand.

The output thrust of the rod 12 is determined by the weight of the weight 22, the second weight 34 and the spring pressure of the head spring 48, and these parameters may be appropriately selected to provide a predetermined output thrust.

Further, the apparatus may be designed to be actuated by vibrations above a suitable predetermined magnitude by appropriately selecting the weight of the weight 22, the spring pressure of the individual tension springs 40 and of head spring 48, the force of friction between keeper member 42 and each stay 16, and the force of friction between keeper member 42 and ball 40.

In addition, the operative part of the apparatus is desirably made of matals or similar materials so that the apparatus may withstand cold or hot climates or wind, rain and snow and ensure reliable performance irrespective of its locality or environment. The housing may be made by comparatively light materials such as aluminum or alloys thereof or plastic materials.

This apparatus is not actuated even if it is tilted to some extent but is actuated in response to vibratory acceleration. However, it is desirably mounted on a horizontal surface and in a concealed locality.

FIGS. 5 to 8 show a second embodiment, which uses a housing suited for the assembly and disassembly of the apparatus. Like parts are designated by like reference numerals and are not repeatedly described.

A partition plate 60 is assembled in the top of the housing 10. A bore 62 is formed in the central portion of the partition plate 60, and the head spring 48 passes through the bore 62. A rim 64 is arranged around the bore 62. Three bores 68 are formed at the periphery of the partition plate 60 at a uniform angular spacing of 120°. An upper portion of each stay 16 upwardly projects from the top of the partition plate 60, passing through each bore 68. Tension springs 66 are each mounted radially between the upper portion 16a of each stay 16 and the rim 64, and each stay is biased towards the vertically movable rod 12, as is most clearly shown in FIG. 6. A cover 70 is screwed into the top of the housing 10 and is hermetically sealed therewith by an 0-ring 72 provided between the cover 70 and the top of the housing 10. An upper portion of the rod 12 upwardly projecting from the cover 70 is covered by a rod cap 74. The rod cap 74 is screwed onto a cylindrical joint 76 which is itself screwed into the top of the cover 70. The cover 70 is also hermetically sealed by an 0-ring 78 provided between the rod cap 74 and the top of the cover 70. The rod is made of a transparent plastic material to permit observation of the state of the rod, and an upper end of the rod 12 is provided with a manual restoration button 52' instead of the said first mentioned ring 52.

Figure 7:
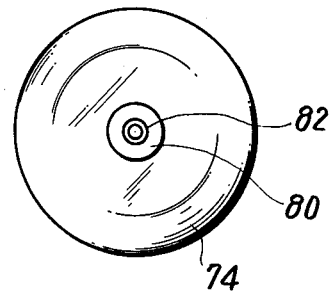
FIG. 7 is a top view of a rod cap in the apparatus of FIG. 6.
Figure 8:
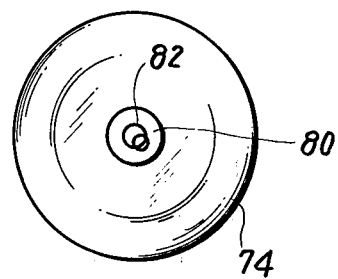
FIG. 8 is a view similar to FIG. 7 and provided for the sake of illustrating the operation.

A first spirit level 80 is screwed on the top of the rod cap 74. As shown in FIGS. 7 and 8, a central ring 82 is drawn on a casing of the level 80, and the level is adjusted such that its air bubble is confined within the ring 82 when the apparatus is vertically held, the air bubbles being displaced in a direction opposite to the direction of tilting of the apparatus. Thus, vertical orientation of the apparatus can be observed from the level. The rod 12 has steps 12a, 12b for correctly positioning the component parts.

In this way, the adjustment at the time of reassembly can be dispensed with. A stopper plate 84 is fixed to the rod at the top of step 12a and head spring 48 is mounted between stopper plate 84 and screw adjustment 50 in the joint 76.

In this embodiment, the construction is simplified as in the preceding first embodiment, and the inside of the apparatus is perfectly sealed from the outside to eliminate the effects of wind, rain and snow. Further, the horizontality degree of the apparatus can be confirmed from the level. Still further, means to position the component parts is provided, so that the adjustment at the time of reassembly can be dispensed with. The structures for mounting the tension springs are by no means limitative. Moreover, the sensitivity of the apparatus with respect to vibrations can be suitably set by appropriately selecting the spring coefficient of the tension springs.

Figure 9:
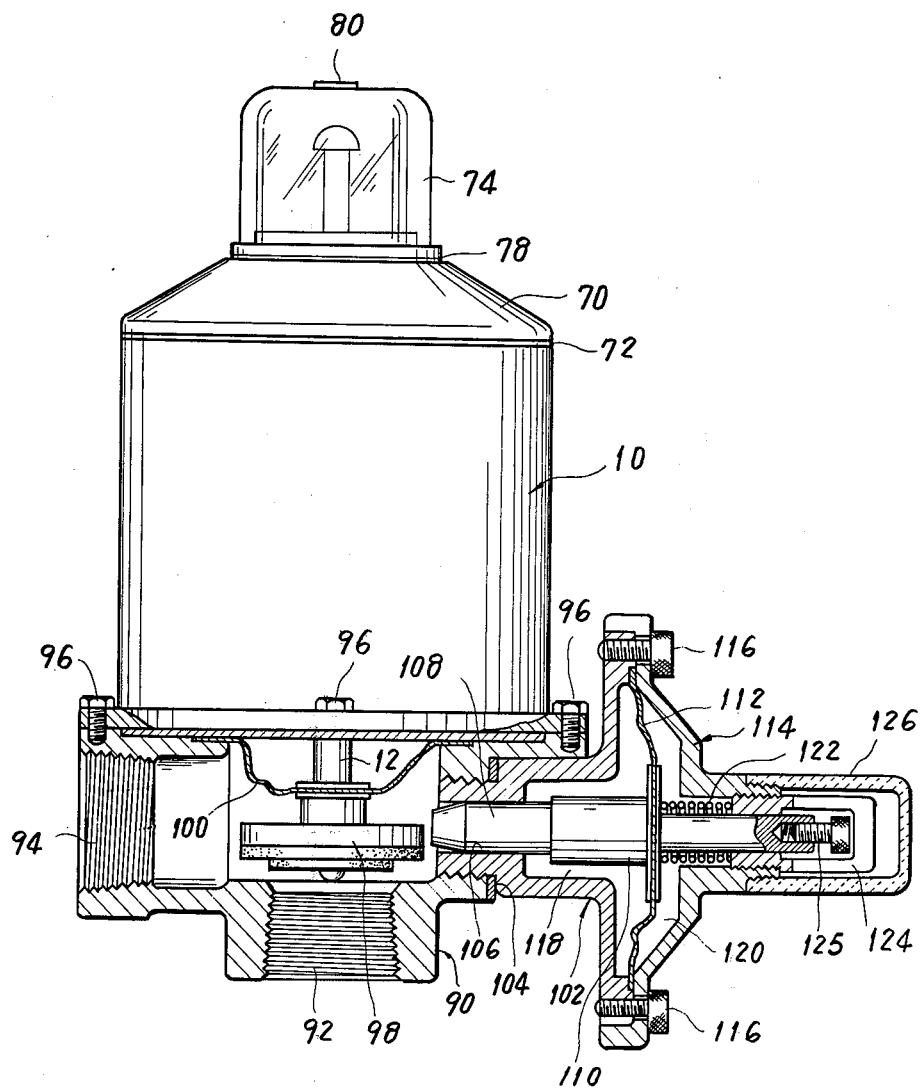
FIG. 9 is an elevational view, partly in section, showing a third embodiment of the apparatus according to the invention applied to a valve provided with safe restoration means.
Figure 10:
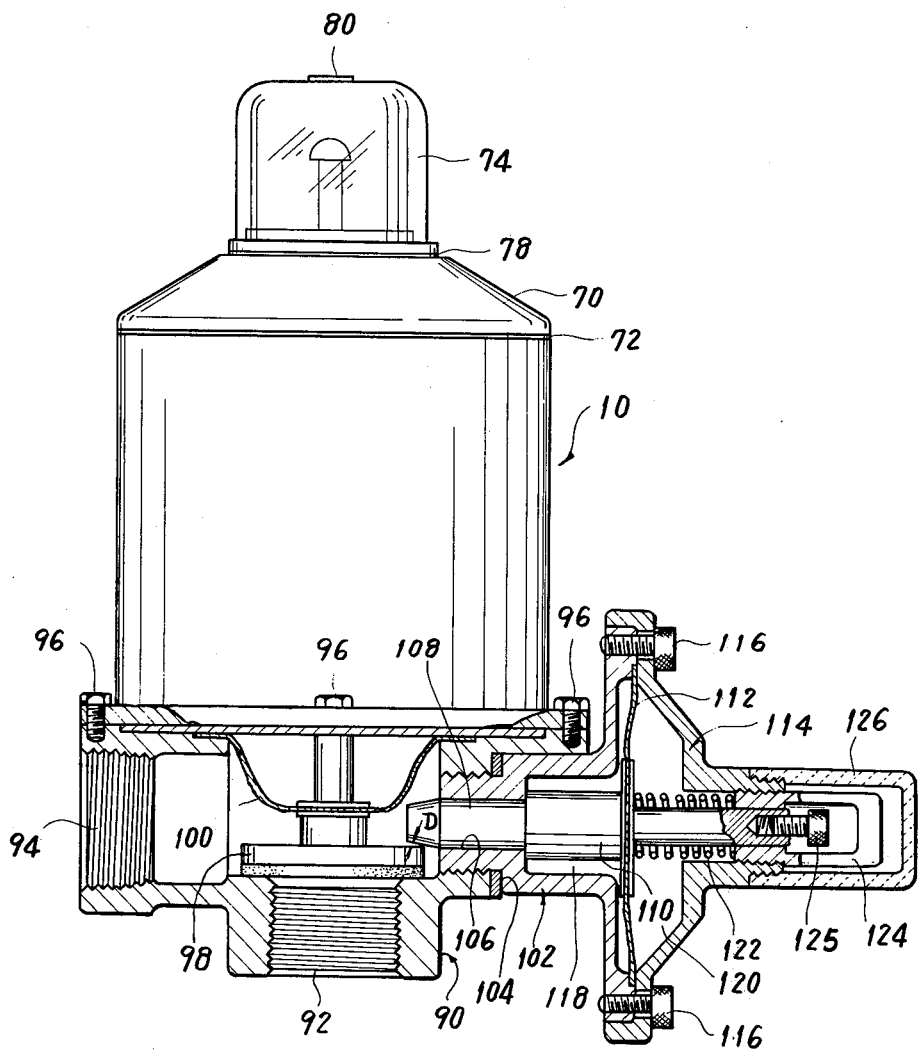
FIG. 10 is a view similar to FIG. 9, partly in section, and provided for the sake of illustrating the operation of the third embodiment.

FIGS. 9 and 10 show a third embodiment of the apparatus according to the invention applied to a valve provided with a safe restoration means. Here, an angle type valve 90 having perpendicular ports 92 and 94 is mounted by a bolt 96 on the underside of housing 10. The lower end of rod 12 extends within this valve 90 and is provided with a valve body 98 secured to the rod 12 and facing the port 92. The valve body 98 is integral with a central portion of a diaphragm 100, the edge portion of which is interposed between valve 90 and housing 10, and which thus hermetically isolates the interior of the housing 10 from the valve 90. A case 102 is screwed via a packing 104 to one side of the valve 90 opposite the port 94 in FIG. 9. A threaded portion of the case 102 is formed with a bore 106 in communication with the valve 90. A stopper shaft 108 extends within the case 102 and is movable in a direction normal to the rod 12. An end of the stopper shaft 108 (left hand end in the Figure) faces the periphery of valve body 98. The stopper shaft 108 has a boss 110 secured to it. The extent of projection of the stopper shaft 108 into the valve 90 is restricted as the front end of the boss 110 engages an inner shoulder of the case 102. A central portion of a diaphragm 112 is secured to the boss 110. The edge portion of the diaphragm 112 is secured to the inner wall of the case 102. A cover 114 is secured by bolts 116 on the rear end of the case 102. The interior of the case 102 and the cover 114 is hermetically divided by the diaphragm 112 into a supply fluid side chamber 118 and an atmospheric pressure side chamber 120.

In the atmospheric pressure side chamber 120, a compression spring 122 biasing the stopper shaft 108 toward the valve 90 is interposed between the rear end of the boss 110 and the inner wall of the rear portion of the cover 114. The spring coefficient of the compression spring is made smaller than the difference between the supplied fluid pressure and atmospheric pressure (the fluid pressure being higher than the atmospheric pressure). Thus, the compression spring 122 is normally compressed such that the tip of the stopper shaft 108 will not obstruct the operation of the valve body 98.

A stopper 124 restricting the displacement of the stopper shaft 108 is screwed in a rear end portion of the cover 114, and an adjustment screw 125 for adjusting the extent of displacement of the stopper shaft 108 into the stopper 124 is screwed in a rear portion of the stopper shaft 108.

A cap 126 is screwed on a rear end portion of the cover 114 and covers the rear end portion of the stopper shaft 108. This cap 126 is made of a transparent plastic material to permit observation of the state of the stopper shaft 108.

The actuated state of this apparatus is shown in FIG. 10. When the apparatus experiences vibrations above a predetermined magnitude, the rod 12 is actuated to let the valve body 98 close the supply side port 92. If an apparatus (not shown) communicating with the end side port 94 remains open after the port 92 is closed, the fluid remaining in the passage between the instant apparatus and the end side apparatus is dissipated so that the pressure in this passage substantially becomes equal to the atmospheric pressure. As a result, the compression spring 122 normally held compressed by the difference pressure between fluid pressure and atmospheric pressure now causes the stopper shaft 108 to slide toward the valve 90 into a postion above the valve body 98, as shown in FIG. 10. In this state, the restoration of the valve body 98 to the initial position by manual operation is blocked.

At this time, there is defined a slight clearance D between the stopper shaft 108 and the upper surface of the valve body 98, but the stopper shaft 108 will not be retreated so long as a cock of the apparatus remains open or unless there is no leakage in the intermediate passage. In this case, by temporarily pulling up the rod 12 fluid is withdrawn from the gap formed between the valve body 98 and port 92 into the end side to restore the initial fluid pressure. Then, by releasing the rod 12 the stopper shaft 108 is retreated to the initial position. By subsequently raising the rod 12 the normal state of FIG. 9 can be restored.

The spring pressure of the compression spring 122 and diameter of the diaphragm 112 are suitably set in conformity to the type and pressure of the supplied fluid.

Figure 11:
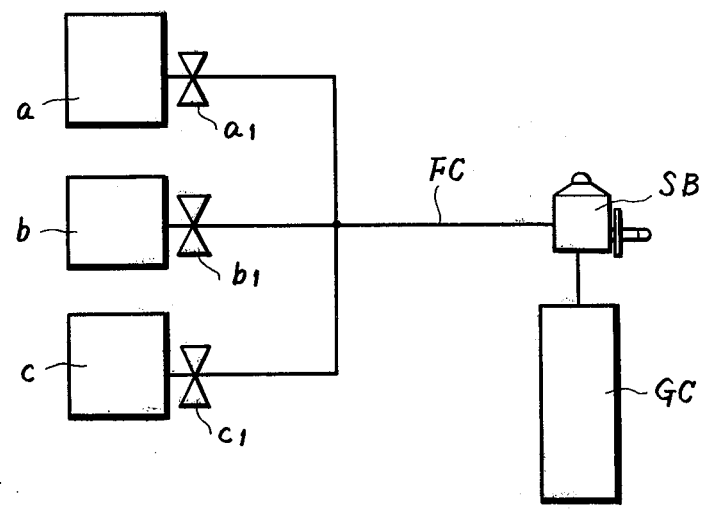
FIG. 11 is a block diagram of an LPG fluid circuit incorporating the apparatus of the present invention.

In FIG. 11, an L.P.G. cylinder GC is connected to each instrument $a$, $b$, $c$, through a fluid circuit FC via the apparatus SB (as shown for instance in FIGS. 9 and 10), and each instrument has cocks $a_1$, $b_1$, $c_1$.

If seismic vibration takes place when a cock $a_1$ of the instrument $a$ is opened and the other cocks are closed, the apparatus SB is actuated, and as a result the fluid circuit FC is closed. Consequently, the instrument $a$ is stopped its motion. In this state, if cock $a_1$ remains open or the fluid circuit FC is broken by the energy of seismic vibration, the restoration of the apparatus SB is actuated and the fluid circuit FC is still closed. When the cock $a_1$ is closed or the fluid circuit FC is in good repair, the apparatus SB is able to reset the fluid circuit FC to open. Thus, the fluid circuit FC remains safe against a fire or a burst by leak-out of the gas.

While preferred embodiments of the invention have been described in detail, it is to be understood that the invention is not limited to the above embodiments and various changes and modifications in the combination and arrangement of component parts and alteration of use are possible without departing from the scope and spirit of the invention as defined by the claims.

What is claimed is:

1. Apparatus actuated by seismic vibration comprising a housing, a rod extending vertically through said housing and being vertically movable between upper and lower positions, a spring means acting on said rod for biassing the rod downwardly, a ball mounted on said rod, a keeper member including a central portion rockably engaged with the ball and an outer projecting portion with a step therein, a plurality of stays pivotably mounted in said housing and disposed around said rod for undergoing inclination relative to the rod, said stays having upper ends engaged in the step of the keeper member to support the rod in the upper position, tension springs mounted on upper portions of the stays and biassing each stay toward the rod, a weight support member fixed to the lower portion of the rod, a first weight having a bore through which the rod passes, said weight being rockably supported by the weight support member and having an outer portion resting on said stays to be horizontally maintained thereby, said stays being pivotable outwardly away from the rod by said weight for releasing the engagement of the stays with the keeper member to permit the rod to drop downwardly, and a second weight having a bore through which the rod passes, said second weight being slidably mounted on the first weight so that during vibration it can travel laterally and apply force to said first weight and thereby to said stays to pivot the same away from the rod.

2. Apparatus as claimed in claim 1 further comprising a partition plate mounted in said housing and provided with a central opening for passage of said rod, said partition plate having slots for passage of said stays and a rim around the periphery of the central opening, said tension springs being connected to said rim to bias the stays toward the rod, said tension springs being stretched between each stay and the rim above the partition plate.

3. Apparatus as claimed in claim 1 wherein said tension springs are connected to respective adjacent stays.

4. Apparatus as claimed in claim 1 wherein said weight support member is hemispherical, said bore in said weight flares outwardly in a downward direction and is seated on the hemispherical weight support member, such that the first weight is rockably supported by the support member.

5. Apparatus as claimed in claim 1 wherein a plurality of recesses are formed in the first weight, balls are seated in said recesses for slidably supporting the second weight on the first weight, said first weight including projecting portions at the edge thereof facing said second weight, said bore in the second weight being larger in diameter than said rod to permit free sliding of the second weight on the first weight.

6. Apparatus as claimed in claim 1 comprising a hermetically sealed cover on said housing, said rod having an upper portion projecting upwardly from the housing and enclosed within said hermetically sealed cover.

7. Apparatus as claimed in claim 6 comprising a level on said cover.

8. Apparatus as claimed in claim 1 comprising a valve secured to the housing, said valve including a valve body secured to said rod and being adapted to be on-off operated by said rod.

9. Apparatus as claimed in claim 8 comprising a safety restoration means acting on said valve body.

10. Apparatus as claimed in claim 9 wherein said safety restoration means includes an actuator actuated by the balance between a fluid pressure and atmospheric pressure.

11. Apparatus as claimed in claim 10 wherein said safety restoration means comprises a case connected to said valve, said actuator comprising a movable rod in the case in opposition to said valve body, and a diaphragm integral with said rod and said case to define on opposite sides of the diaphragm a fluid side chamber and atmospheric side chamber.

12. Apparatus as claimed in claim 11 wherein said safety restoration means further comprises a spring-loaded stopper shaft biassing said rod toward the valve body against fluid pressure.

13. Apparatus as claimed in claim 11 wherein said safety restoration means further comprises an adjustment screw on said stopper shaft.

* * * * *